P. Emmons

Felting Machine.

No. 369.

Reissued May 27, 1856.

UNITED STATES PATENT OFFICE.

ALBERT SPENCER AND ALVE E. LAING, OF NEW YORK, N. Y., ASSIGNEES OF PHINEAS EMMONS, OF SAME PLACE.

IMPROVEMENT IN MACHINES FOR P ANKING HAT-BODIES.

Specification forming part of Letters Patent No. 9,672, d d April 19, 1853; Reissue No. 369, dated May 27, 185

*To all whom it may concern:*

Be it known that we, ALBERT SPENCER and ALVE E. LAING, both of the city, county, and State of New York, assignees in full of all the right, title, and interest of PHINEAS EMMONS, of the city, county, and State aforesaid, in and to certain Letters Patent of the United States bearing date the 19th day of April, 1853, for certain Improvements in Machinery for Sizing Hat-Bodies, do hereby declare that the following is a full and clear description of the same.

The nature of the invention consists in the use of an endless table or band having a differential and forward revolving motion over suitable rollers in a water-box, in combination with a vibratory or stationary rubber or presser, by means of which forward revolving and differential or vibratory motion of the endless table or band and vibratory or stationary rubber or presser a forward vibratory rolling and pressing action is given to the roll of felt or hat-body in sizing it up, precisely in effect like that given to it by an operative in sizing up hat-bodies by hand; but to describe the invention more particularly-reference will be made to the accompanying drawings, forming a part of this specification, the same letters of reference, wherever they occur, referring to like parts.

Figure 3:
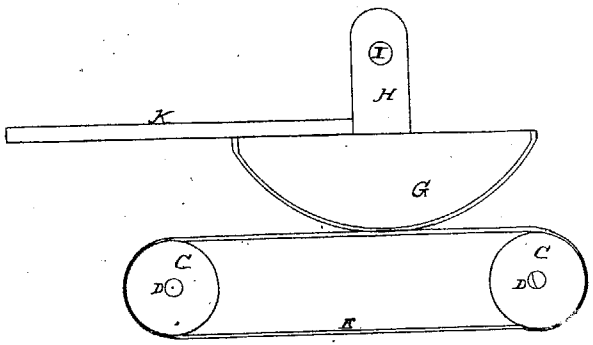
Figure 1:
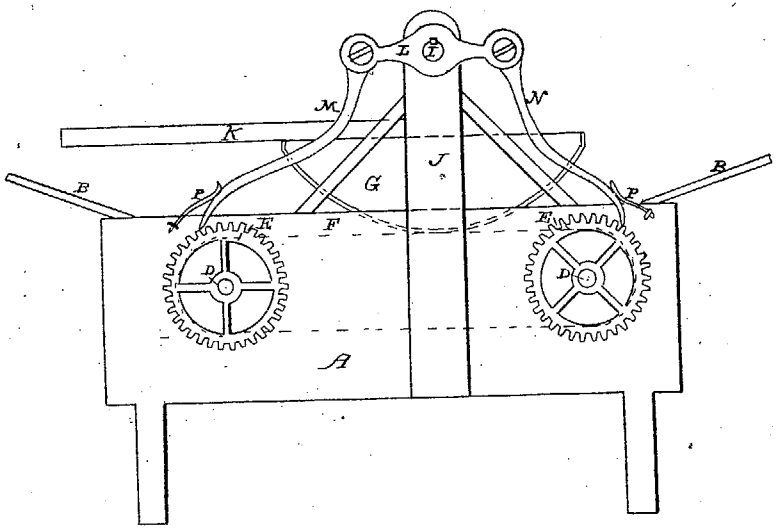
Figure 2:
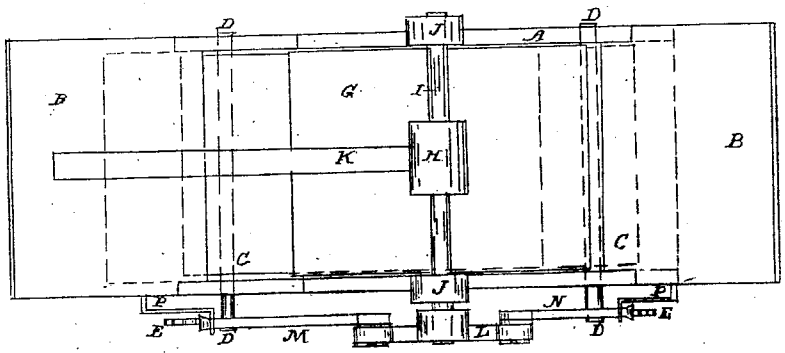

Figure 1 is a side elevation of the machine, showing by the red dotted lines the position of the endless table or band. Fig. 2 is a plan view of the machine. Fig. 3 is a detached sectional view of the endless table or band and rollers and rubber or presser.

Letter A is a water box or trough. This box serves the purpose of a frame for the machine, and also for holding the hot water for sizing purposes. At the ends of it are two feed-boards, B.

Letters C are two carrying-rollers arranged transversely of the water box or frame on gudgeons D and D, which project through the sides of the frame, and having at one end ratchet-wheels E.

Letter F is an endless table or band. (Represented by red dotted lines, Fig. 1.) This endless table or band may be made of any suitable material and way for the purposes required, but is intended to be firm enough, either by its own rigidity or by other supporting means, to preserve under the pressure of a presser always a constant and required pressure on the roll of felt throughout the operation of rolling, pressing, and working the roll through the machine. This curved presser is supported by a post, H, secured to its upper side and suspended from a rock-shaft, I, supported upon standards J J, elevated from opposite sides of the water-box or frame of the machine.

Letter K is an arm or lever attached to the presser for the purpose of vibrating it, (when required to be vibrated,) and at the same time working the rock-shaft I, double-acting cross-head L, attached thereto, pawls M and N, and ratchet-wheels E E on the ends of the carrying-rollers C C, for the purpose of giving to the endless table or band a forward revolving and differential or vibratory motion, so as to give to the roll of hat-bodies an alternating rerolling and forward-rolling motion through the machine, for the purpose of working up the fibers of the wool or fur, similar in operation to hand-sizing.

Letters P P are springs holding the pawls down upon the teeth of the ratchet-wheels.

It will be obvious that various modifications may be made in the mode of working the endless table or band in combination with a rubber or presser, and therefore we do not deem the specifying of any such various modes material to the invention, so long as the required motion is given to the endless table or band for the purposes set forth.

The object of the invention is to produce precisely the same handling or working of the hat-body (or bodies, as the case may be) in a roll in passing through the machine as is produced by the hand operation of "planking" or "sizing" (technically speaking) "hat-bodies" by means of the vibratory revolving endless table and vibratory or stationary pressure.

The precise form of the rubber or presser may be varied without materially lessening its effects, and this whether it is stationary or worked by an analogous motion on an endless revolving vibratory table or band, or revolving endless table without a vibratory motion; but as these variations of form, as well as of principle of operation and motion, are so obvious to all practical men it is not deemed important to mention them, though we do not disclaim the right to any of the said variations, so long as the operations are analagous and substantially the same.

Having now described the invention, we will proceed to state what we claim and desire to secure by Letters Patent of the United States—

The use of an endless table or band having a differential or vibratory forward revolving motion, in combination with a rubber or presser operating substantially as hereinbefore set forth, whereby a forward vibratory rolling and pressing motion is given to the roll of hat-bodies or felt for sizing it up, and at the same time carrying it through the machine, made and operating substantially as hereinbefore set forth.

ALBERT SPENCER,
ALVE E. LAING,
*Assignees of Phineas Emmons.*

Witnesses:
E. FRANCIS COREY, Jr.,
EDWIN F. COREY.